Dec. 12, 1967 H. J. WHELAN 3,357,189
PRECAST HOLLOW CORE CHARGE FOR A ROCKET MOTOR
AND METHOD FOR CASTING SAME
Filed Sept. 8, 1965 2 Sheets-Sheet 1

INVENTOR.
HOWARD J. WHELAN
BY Thomas M. Brennan

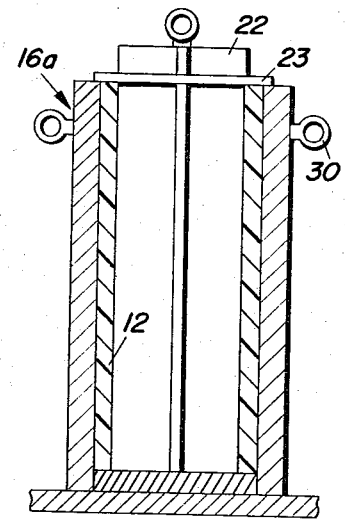
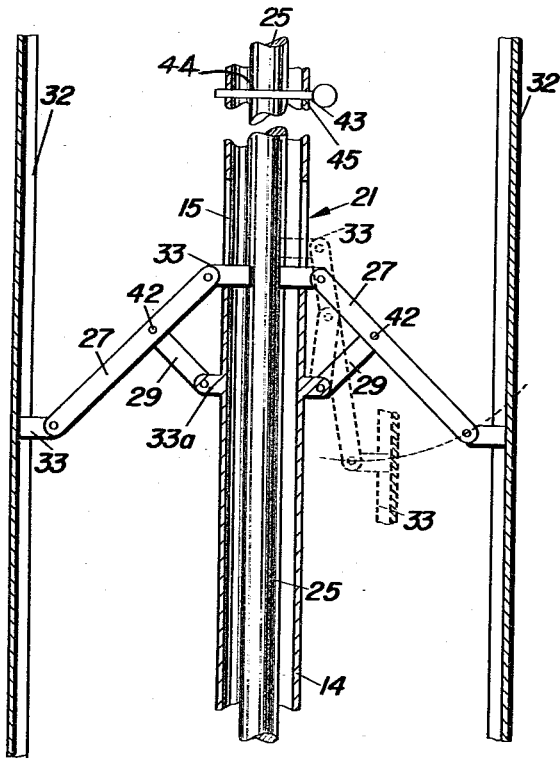
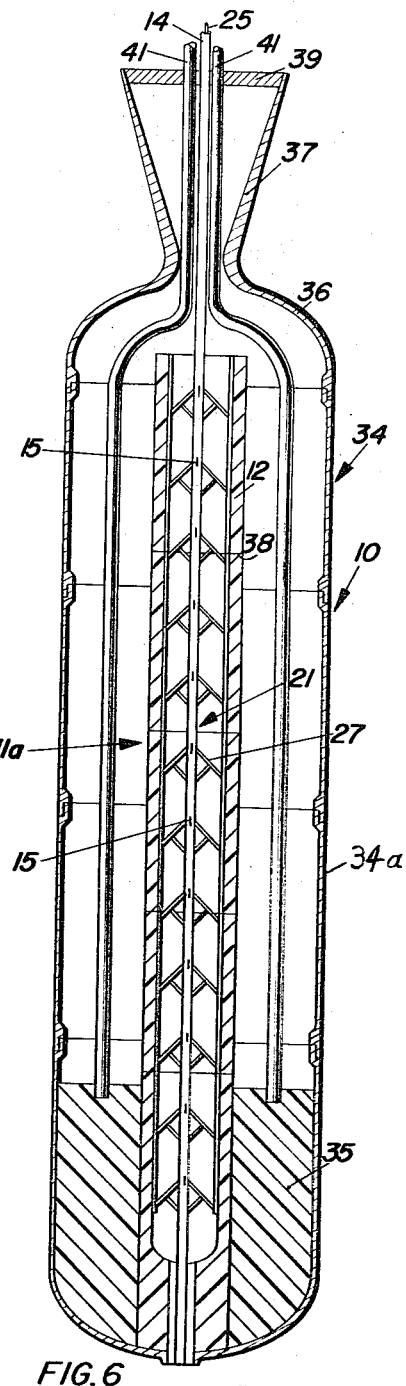
FIG. 7
FIG. 5
FIG. 6
INVENTOR.
HOWARD J. WHELAN
BY Thomas W. Brennan

United States Patent Office 3,357,189
Patented Dec. 12, 1967

3,357,189
A PRECAST HOLLOW CORE CHARGE FOR A ROCKET MOTOR AND METHOD FOR CASTING SAME
Howard J. Whelan, Bountiful, Utah, assignor to Thiokol Chemical Corporation, Bristol, Pa., a corporation of Delaware
Filed Sept. 8, 1965, Ser. No. 485,764
6 Claims. (Cl. 60—255)

ABSTRACT OF THE DISCLOSURE

A precast, hollow core propellant charge for a solid propellant rocket motor, which core is supported by a collapsible supporting structure during casting and curing of the propellant in the charge. The support structure is removable from the core after cure through the nozzle opening of the motor. A method for casting the charge comprising the steps of casting a combustible, hollow shell (core) of solid propellant in a mold, supporting the inner surfaces of the shell and casting the remainder of the charge therearound is included.

---

This invention relates to aparatuses and processes for manufacturing solid propellant rocket motors, and, more particularly, to such apparatuses and methods wherein precisely-formed ignition surfaces are provided in said motors.

In prior art solid propellant rocket motors, it is the usual practice to form the ignition chamber thereof by placing a mandrel in an empty rocket motor case and casting the propellant thereabout. After curing of the propellant and removal of the mandrel, a solid propellant charge is produced which includes a central chamber of the desired geometry, the walls of which constitute the initial burning surface of the rocket.

The above process for forming the combustion chamber of a solid propellant rocket has several disadvantages. As solid propellant rockets are manufactured in larger sizes, larger and heavier mandrels must be utilized wherein greater forces must be applied to withdraw these mandrels from the solidified or cured propellant charge. Further complicating the withdrawal of these mandrels is the increase in surface of contact between the propellant charges and the mandrels and the greater masses of the propellant charges.

In other instances, for example, rocket motors having cases formed of wrapped or wound fibers, it is desirable to fabricate the cases with non-separable end domes, i.e., monolithic or integrated, motor cases. In such constructions, however, the aperture, i.e., nozzle throat area, in the aft end portion of the case is usually smaller than the charge combustion chamber cross-sectional area and passage therethrough of the conventional mandrel for forming the ignition chamber is prevented. Hence, some other means such as a collapsible mechanism or the like must be utilized.

Further disadvantages are encountered in removing the mandrels from solid propellant charges in that frequently damage occurs to the desired ignition surfaces of the propellant charge. Most usually this damage takes the form of tears, cracks, or other surface irregularities. These defects usually produce a dangerous increase in the surface area exposed to the flame front which generally results in a catastrophic failure due to very rapid pressure rise in the chamber. And, because there is no satisfactory method of reclaiming cured propellant, rocket motors in which such propellant surface damage occurs are usually scrapped. Therefore, it is readily apparent that ability to ensure the obtaining of acceptable burning surfaces in a propellant charge prior to installation thereof in a motor is highly advantageous, since costly waste of valuable propellant is eliminated. Further, loss of valuable equipment and potential injury to personnel because of unexpected explosions is considerably reduced.

This invention then, in its broadest aspects, is the provision of a prefabricated ignition chamber for a solid-propellant rocket motor comprising a precast column or shell of solid propellant containing a central cavity of the desired geometry, supported by a collapsible, externally-operable, removable means. By use of this invention, the disadvantages above-mentioned are significantly avoided or entirely eliminated.

It is therefore an object of ths invention to provide means for forming the ignition chamber of a large solid propellant rocket that eliminates the necessity of using very large mandrels and attendant complex handling and removal equipment.

Another object of this invention is to provide an apparatus for forming an ignition chamber in a rocket motor wherein the ignition surface thereof is rendered capable of being inspected and its quality discerned prior to committing the bulk of the propellant comprising the charge to curing in the rocket motor casing.

Still another object of the invention is to provide an apparatus of the character referred to wherein any desired ignition surface can be formed externally from the rocket motor in the form of a hollow, combustible core or shell which thereafter becomes part of the propellant charge in said motor.

A still further object of the invention is to provide a novel method of forming a rocket motor propellant charge.

Another object of the invention is to provide a novel method of forming the charge in a solid propellant rocket motor which includes the steps of forming a hollow combustible core or shell, supporting the core or shell and casting the remainder of the charge therearound after installation of the shell in the rocket motor case.

Other objects and advantages of the invention will become apparent as the following description is read with reference to the accompanying drawings, wherein the same parts are designated by identical characters throughout the views.

In the drawings:

FIGURE 5 is an enlarged sectional view of a portion of the support apparatus of the invention illustrating several of its parts;

FIGURE 6 is a sectional view of a rocket motor of the segmented or sectional case type having installed therein the preformed shell enclosing the ignition chamber of the invention illustrating its position during propellant filling and, FIGURE 7 is a view similar to FIG. 2 illustrating a portion of the shell enclosing the ignition chamber set forth in FIG. 1 and the forming means therefor.

Figure 1:
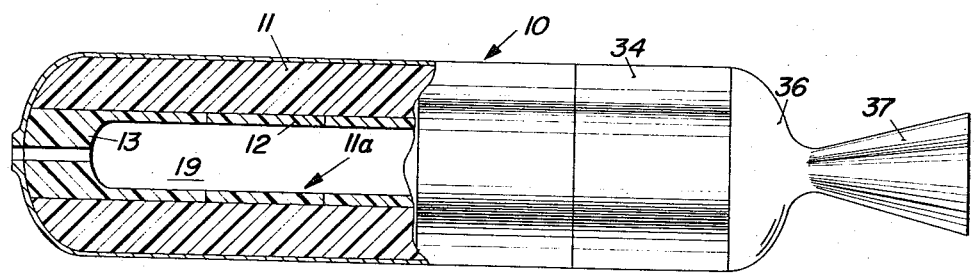
FIGURE 1 is a partially sectioned, elevational view of a solid propellant rocket motor containing a portion of a core or shell enclosing the performed ignition chamber of the invention.

Referring now to the drawings, and in particular to FIG. 1, the invention is shown in its preferred form and comprises a rocket motor 10 containing a centrally perforated main propellant charge 11. Centrally disposed in propellant 11 is a preformed solid propellant core or shell 11-a comprising a plurality of preformed solid propellant segments 12 assembled on a bottom or head end segment 13, which are fabricated in accordance with an apparatus of the type hereinafter to be described with reference to FIGS. 2 and 7.

Figure 2:
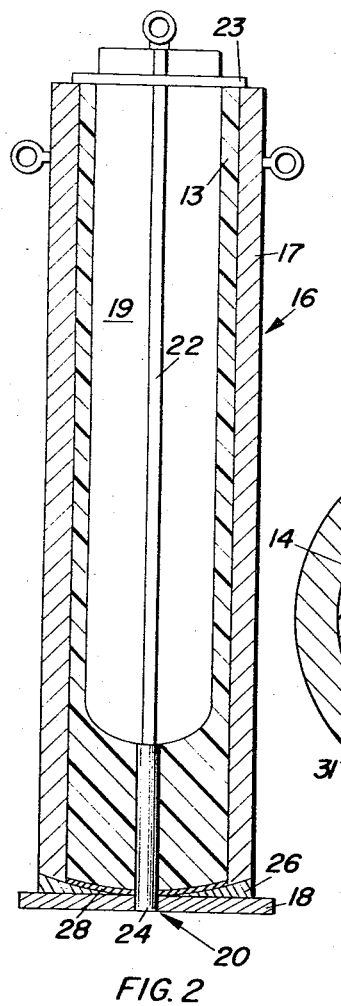
FIGURE 2 is a sectional view of the ignition chamber of the invention illustrating a forming means for the core or shell enclosing it.

Segments 12 are preformed and fabricated by means of a molding apparatus 16-a in FIG. 7, while head end segment 13 is similarly constructed by means of the molding apparatus 16 of FIG. 2. Molding apparatus 16 (FIG. 2) comprises a generally cylindrical, hollow mold 17 of split construction equipped with a plurality of handling eyebolts 30 preferably fixed to its upper periphery. Mold 17 is centrally located or mounted on a base plate 18 having a central hole or perforation 20 the purpose of which will hereinafter be set forth. Positioned in mold 17 is a conventional mandrel 22 selected to provide a propellant 11 ignition surface of predetermined cross-sectional configuration. Mandrel 22 has a projection 24 which is seated or inserted in perforation 20 of base plate 18. Projection 24, as will become more apparent from what follows, serves a twofold purpose of fixing the depth of head end propellant beyond the initial burning surface and providing a head end port for the motor ignition means (not shown). A flange or cover 23 is positioned over mandrel 22 on mold 17, whereby in FIGS. 2 and 7, as is usually preferred, flat upper surfaces on segments 13 and 12 are formed.

As described above with reference to FIG. 2, apparatus 16 is utilized to preform the forward or head end segment 13, the interior of which is the head end portion of an ignition and/or combustion chamber 19. The exterior contour of head end segment 13 is formed by means of a concave spacer 26 and insulation 28 which are placed at the extreme head end of mold 17. Concave spacer 26 has the same curvature as the interior of the head end of motor 10. After assembly of apparatus 16 and positioning of mandrel 22, propellant in an uncured state is poured into mold 17 and subjected to a solidifying heat treatment.

The process and apparatus used in preforming remaining segments 12 (and combustion chamber 19) is similar to that above described except that concave spacer 26 and insulation 28 are omitted, and mandrel 22 is modified as indicated. In this way, segments 12 are fabricated as preformed hollow cylinders of solid propellant, and together comprise a core or shell 11-a.

Figure 3:
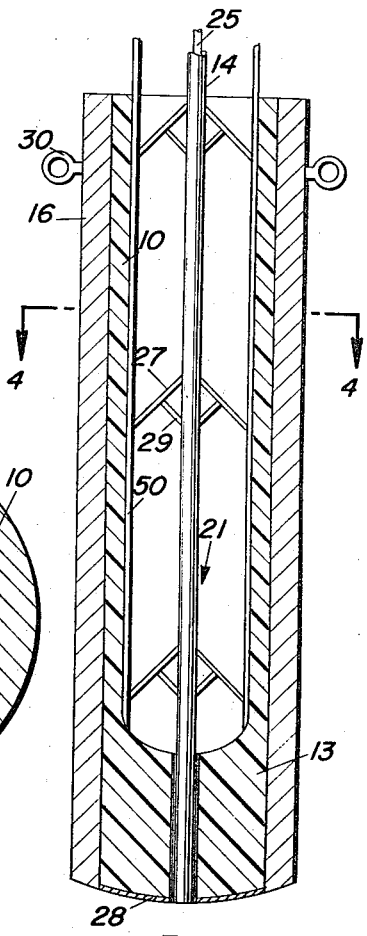
FIGURE 3 is a sectional view of a preformed shell enclosing the ignition chamber positioned in its forming means illustrating a support and reinforcing apparatus therefor.

After the propellant in segment 13 is cured, mandrel 22 is removed and a collapsible support mechanism or apparatus 21 is inserted in the cavity or perforation remaining (see FIGS. 3 and 6). Apparatus 21 comprises a central tube 14 having vertically running elongated holes or slots 15 spaced uniformly along its length and peripherally around its surface. Positioned concentrically within tube 14 and movable therewithin is an elongated rod 25. Attached to rod 25 by a plurality of arms or linkages 27 and actuating links 29 spaced along its length are ignition surface support members 31 and 32 (shown most clearly in FIGS. 4 and 5). Support members 31 having concave forms, are elongated to contactably conform to the "valleys" of the star-shaped perforation of hollow core or shell 11-a segments 12 and 13 in support thereof. Similarly support members 32 having convex forms, are also elongated to contactably conform to the "points" of the star-shaped perforation hollow core or shell 11-a segments 12 and 13 in support thereof.

Arms or linkages 27 are attached to rod 25 by means of pivot arms 33 extending therefrom through holes or slots 15 and to support members 31 and 32 by similar means best illustrated in FIG. 5.

Figure 4:
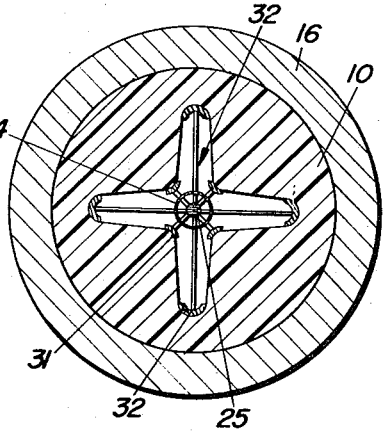
FIGURE 4 is a view of the invention taken on line 4—4 of FIGURE 3.

Segments 12 are assembled in an empty casing 34 which can be a unitary structure or an assembly of cylindrical sections 34-a as illustrated in FIG. 6. Each segment 12 and head end segment 13 is cast as above indicated such that handling thereof while supported by mechanism 21 is facilitated and transportation to rocket motor 10 and placement in casing 34 at the launch site is accomplished with minimum effort. FIGURE 3 illustrates a typical preformed head end 13 combustion chamber segment ready for transporting to and installation in rocket casing or sectional assembly 34 at the launch site. FIGURE 4 illustrates segment 12 (or 13) assembly including mechanism or apparatus 21 wherein "star" cross-sectioned propellant is shown including the manner in which the star "valleys" are supported by members 31 and star "points" by members 32. Mechanism or apparatus 21 and its operation is described hereinbelow with reference to FIG. 6.

FIGURE 6 illustrates in its preferred embodiment preformed solid propellant core or shell 11-a enclosing combustion chamber 19, as above indicated installed in segmented or sectional motor 10 casing 34. Casing 34 comprises individual sections 34-a which are assembled substantially as shown, and well known to the skilled artisan, except for the aft or nozzle section 36. Preformed head end segment 13 is positioned in motor case 34 in the head end thereof. Segments 12 are next installed in sequence. Angular alignment of each segment 12 is insured by sliding each one in turn over previously positioned structure 21. Apparatus 21 can be fabricated in parts for supporting each segment 12, or in a single integral structure as shown in FIG. 6. In the former case connecting means between its separable parts (not shown) must be provided to insure adequate stiffness in its supporting function. It is preferred to use a single structure for apparatus 21 upon which are installed the segments 12 following positioning of apparatus 21 in casing 34, and installation of head end segment 13. A bonding material 38 is applied to each segment 13 and 12 interfaces thereby forming continuous hollow column, core or shell 11-a of solid propellant surrounding combustion chamber 19.

The aft-end section 36 is then attached to the rocket case 34 with central tube 14 and rod 25 of support structure 21 extending through the nozzle 37 of aft end section 36 whereby operation of mechanism 21 can be performed exteriorly of motor 10. A cover 39 is positioned in nozzle 37 in the exit cone thereof which is secured to the aft end of the nozzle 37 and aids in centering tube 14 within casing 34 of motor 10.

After placement of mechanism 21, a pair of fill lines or hoses 41 are inserted through appropriate openings in centering device or cover 39. Solid propellant 11 in slurried or uncured form is then pumped into case 34 interior through hoses 41 filling the space around hollow column or shell 11-a formed by propellant segments 12 and 13 to a predetermined level. Hoses 41 are then withdrawn and propellant 11 is subjected to a heat treatment or otherwise permitted to solidify during which it becomes bonded to core or shell 11-a and rocket case 34 interior walls. Support structure or mechanism 21 is then collapsed and withdrawn through the nozzle 37-a as will presently be described.

As indicated hereinbefore, collapsible support structure or apparatus 21 shown in FIGS. 4 and 5, comprises longitudinally extending, concave support members 31 (valley) and convex support members 32 (point) alternately spaced about central rod 25 in tube 14. Supports 31 and 32 are laterally disposed from tube 14 (and rod 25) in parallel relation thereto, and are movable in a lateral direction by means of the plurality of articulating linkages or arms 27 and links 29 spaced along the length of tube 14 and rod 25. Arm 27 is pivotally attached at one end central rod 25 by pivot 33 which horizontally extends from rod 25 through slot 15 in tube 14. A similar pivot 33, mounted on supports 31 and 32, provides means for attachment of the opposite end of arm 27. Short link 29 is pivotally attached at one of its ends to tube 14 by means of pivot 33-a (FIG. 5) and at its other end to arm 27 by means of central pin 42. Thus it is seen that a vertically upward motion of rod 25 relative to the tube 14 will alter the angular relationship of arms or linkages 37 with respect to rod 25 and will cause supports 31 and 32 to move inwardly along a substantially arcuate path, away from the ignition surface valleys (and points) in combustion chamber 19. Rod 25 is fixed in its upward movement by means of a pin or clevis 43 which is insertable in previously drilled holes 44 and 45 in rod 25 and tube 14 (FIG. 5) respectively. Other means for fixing rod 25 relative to tube 14 after actuation thereof will occur to the skilled person and can include holding means (not shown) such as an externally attached or held hoist, or by hand. After supports 31 and 32 ar actuated and thereby disengaged from the ignition surface of propellant 11, mechanism 2 is extracted from casing 34 through the exit cone of nozzle 37 in aft end section 36.

The preferred form of the invention has been described in some detail, and comprises a prefabricated core or shell 11-a of solid propellant enclosing ignition or combustion chamber 19 for a solid propellant rocket motor, in combination with a support apparatus such as mechanism 21 therefor. It also consists of a process for fabricating a solid propellant charge for a rocket motor having a perforated, centrally disposed ignition chamber including the ignition surfaces of said charge wherein the surfaces and chamber are formed, inspected and installed in the motor casing as part of a hollow core or shell prior to the main portion of the propellant which comprises forming a solid propellant core or shell around a mandrel of predetermined cross-section thereby determining the ignition surface configuration, removing the mandrel inspecting said propellant ignition surfaces and supporting, said shell, preferably by inserting a collapsible support mechanism therefor, positioning said supported shell or core in a motor casing, casting the main body of propellant around said supported shell or core, collapsing said supporting mechanism and removing it from said shell or core and casing interior.

It will also be evident that other mechanisms can be used in carrying out the process of the invention for supporting and fabricating the ignition chamber and propellant shell or core containing it. Such mechanisms include inflatable bags, used either singly or in a plurality depending on whether shell or core 11-a and chamber 19 therein is formed in a monolithic column (i.e., single shell comprising head end segment 13 and several cylindrical segments 12) as indicated and described hereinbefore. Thus after removal of mandrel 22, an inflatable, elastomeric or other plastic material bag is inserted in place of mandrel 22 and inflated thereby providing support for segments 12. These bags can easily be made in a form corresponding to the cross-sectional configuration of ignition chamber 19, and of a thickness and flexibility to adequately support while inflated or be easily removed while deflated.

It is readily apparent that other forms and embodiments of the invention are possible than as hereinbefore described and illustrated without departing in any significant manner from its spirit or diminishing its scope. Therefore, no limitations thereof should be placed upon the invention except as set forth in the subtended claims.

What is claimed is:

1. A process for casting the charge in the casing of a solid propellant rocket motor, said motor having an aft end attached nozzle, comprising the steps of precasting a hollow solid propellant shell defining an ignition chamber of predetermined cross section, inserting a collapsible support in said shell, said support contacting the inner walls of said chamber on preselected portions of the area thereof positioning said supported shell in the casing of said rocket motor, pouring uncured propellant in said casing around said shell, permitting said propellant to cure to form said charge in said casing, collapsing said shell support, and removing said support through said nozzle attached to said motor.

2. A solid propellant rocket motor comprising, in combination, a casing, a solid propellant, prefabricated hollow core centrally positioned in said casing, said core having inner surfaces comprising the ignition surface of said motor, and an apparatus in said chamber for supporting said chamber walls, said apparatus comprising a hollow central tube extendible longitudinally within said core, a movable rod in said tube, a plurality of movable members laterally disposed from said tube contacting said ignition surfaces, at least one articulating means disposed on said tube and connected to said members, said tube and said rod for moving said members, said tube having at least one slot for passing a portion of said articulating means therethrough to connect to said rod, said members movable in response to vertical motions of said rod relative to said tube, and holding means for fixing said rod in position prior to and after movement thereof with respect to said tube.

3. The motor of claim 6 wherein the shell comprises at least two end bonded hollow segments of precast solid propellant.

4. The rocket motor of claim 6 wherein the means for supporting the shell is an apparatus comprising a longitudinally extending tube having a plurality of slots spaced along its length, a rod in said tube extendible therewith and protruding externally therefrom, articulating means connected to said tube and to said rod through said tube slot, a plurality of movable support members connected to said articulating means to contact said chamber ignition surfaces for supporting said shell, said members movable from said surfaces in response to a vertical movement of said rod with respect to said tube, and means for fixing the position of said rod after movement thereof.

5. The rocket motor of claim 4 wherein the articulating means comprises an articulating arm pivotally attached at one end to said rod through said tube slot and at its other end to one of said support members, and a linking arm pivotally attached at one end to said tube and at its other to said arm.

6. A rocket motor comprising a casing, a precast, hollow solid propellant shell defining an ignition chamber of predetermined cross-section centrally positoned in said casing, mechanical support means in said chamber contacting the chamber inner walls along preselected portions of the longitudinal area thereof for supporting and positioning said shell, said support means being collapsible and removable prior to ignition of said shell and additional solid propellant surrounding said shell and filling said casing.

References Cited

UNITED STATES PATENTS

| 2,956,401 | 10/1960 | Kane | 60—256 X |
|---|---|---|---|
| 3,017,746 | 1/1962 | Kiphart | 60—255 |
| 3,062,147 | 11/1962 | Davis et al. | 60—256 X |
| 3,088,273 | 5/1963 | Adelman et al. | 60—253 |
| 3,121,993 | 2/1964 | Pennington | 60—255 X |
| 3,186,035 | 6/1965 | Grace | 264—3 X |
| 3,196,735 | 7/1965 | Baldwin. | |

CARLTON R. CROYLE, *Primary Examiner.*